United States Patent
Cao et al.

(10) Patent No.: US 9,091,602 B2
(45) Date of Patent: Jul. 28, 2015

(54) QUANTUM THEORY CORRECTION METHOD AND SYSTEM FOR IMPROVING ACCURACY OF TEMPERATURE MEASUREMENT OF RADIATION THERMOMETER

(75) Inventors: Bolin Cao, Tianjin (CN); Chengzhang Tan, Tianjin (CN); Rui Cao, Tianjin (CN); Chenggang Liu, Tianjin (CN)

(73) Assignee: TIANJIN YITONG ELECTRIC TECHNOLOGY DEVELOPMENT CO., LTD., Tianjin (CN)

( * ) Notice: Subject to any disclaimer, the term of this patent is extended or adjusted under 35 U.S.C. 154(b) by 195 days.

(21) Appl. No.: 13/520,341

(22) PCT Filed: Mar. 18, 2011

(86) PCT No.: PCT/CN2011/071978
§ 371 (c)(1),
(2), (4) Date: Jul. 3, 2012

(87) PCT Pub. No.: WO2012/019459
PCT Pub. Date: Feb. 16, 2012

(65) Prior Publication Data
US 2013/0148688 A1    Jun. 13, 2013

(30) Foreign Application Priority Data
Aug. 11, 2010  (CN) .......................... 2010 1 0250266

(51) Int. Cl.
*G01K 15/00* (2006.01)
*G01N 3/00* (2006.01)
(Continued)

(52) U.S. Cl.
CPC .............. *G01K 15/005* (2013.01); *G01J 5/522* (2013.01); *G01J 2005/0048* (2013.01)

(58) Field of Classification Search
USPC ............ 374/2, E15.001, E15.002; 250/252.1, 250/341.5
See application file for complete search history.

(56) References Cited

U.S. PATENT DOCUMENTS 3,970,848 A * 7/1976 Schott et al. ............... 250/252.1
5,690,429 A   11/1997 Ng
5,933,792 A * 8/1999 Andersen et al. ............... 702/32
(Continued)

FOREIGN PATENT DOCUMENTS

CN      1185831 A    6/1998
CN      1724984 A    1/2006
(Continued)

*Primary Examiner* — Lisa Caputo
*Assistant Examiner* — Nasir U Ahmed
(74) *Attorney, Agent, or Firm* — George G. Wang; Bei & Ocean

(57) ABSTRACT

The present invention provides a quantum theory correction method for improving the accuracy of temperature measurement of radiation thermometer and a radiation thermometer system. The invention is related to the radiation thermometer in the field of instrumentation. The present invention acquires parameters reflecting energy level structure by adopting effective physical model to process data and using keyboard input or data transmission. The temperature of the object to be measured is finally acquired and displayed on the displayer. The quantum theory correction method and radiation thermometer system effectively overcome the difficulty that the value of radiance $\epsilon(\lambda \cdot T)$ cannot be accurately measured in the event that radiance correction method is used to improve the accuracy of radiation thermometer. Thus, the accuracy of thermometer is improved significantly.

14 Claims, 6 Drawing Sheets

(51) Int. Cl.
*G01J 5/52* (2006.01)
*G01J 5/00* (2006.01)

(56) References Cited

U.S. PATENT DOCUMENTS

| | | |
|---|---|---|
| 6,398,406 B1 | 6/2002 | Breiland et al. |
| 6,770,880 B2 * | 8/2004 | Nakamura et al. ............ 250/330 |
| 7,661,876 B2 * | 2/2010 | Liebmann ........................ 374/2 |
| 8,274,050 B2 * | 9/2012 | Grimberg .................. 250/338.1 |

| | | | |
|---|---|---|---|
| 2008/0095212 A1 | 4/2008 | Jonnalagadda et al. | |

FOREIGN PATENT DOCUMENTS

| | | |
|---|---|---|
| CN | 101419095 A | 4/2009 |
| JP | 01-098930 | 4/1989 |
| JP | 02-028524 | 1/1990 |
| JP | H0815036 A | 1/1996 |
| JP | 09-329498 | 12/1997 |
| JP | 2003-214956 A | 7/2003 |
| JP | 2003-294535 A | 10/2003 |

* cited by examiner

QUANTUM THEORY CORRECTION METHOD AND SYSTEM FOR IMPROVING ACCURACY OF TEMPERATURE MEASUREMENT OF RADIATION THERMOMETER

TECHNICAL FIELD

The present invention is related to a radiation thermometer in the field of instrumentation, particularly a quantum theory correction method and radiation thermometer system for improving accuracy of radiation thermometer.

BACKGROUND OF THE INVENTION

Radiation Thermometer, usually referred to as infrared thermometer, is a high-precision non-contact temperature detector, which receives thermal radiation energy of the object to be measured through optical system, converts it into electrical signals, processes data by microcomputer, and displays temperature value on the displayer. Signal processing of the microcomputer inside the radiation thermometer is based on the functional relationship between thermal radiation energy received by instrumentation and temperature of the object to be measured.

In domestic and international prior arts, radiation thermometers are designed on the basis of thermal radiation rule of ideal black body model, where the object to be measured is assumed as ideal black body. The ideal black body is represented as standard blackbody, which is listed in the compulsory verification instrumentation catalogs by metrology laws globally. However, people are facing a problem that objects to be measured are featured by various thermal radiation conditions. A real result will not be available unless the relationship between the thermal radiation rule of ideal blackbody and that of various objects is obtained when radiation thermometer is applied. However, blackbody radiation theory, established at the end of $19^{th}$ century, in which the difference between ideal blackbody and objects, based on Kirchhoff's Law in classical theories, was simplified as only the radiance. Therefore, it is difficult to correct radiance in a long term when people attempt to establish the relationship between thermal radiation rule of ideal blackbody and that of objects to be measured. The accuracy of temperature measurement can not be improved. Actually, it is one of the difficulties encountered by classical theories. The formula and method applied in prior arts are based on principles of:

I. Principle Using Physical Model of Ideal Blackbody

As an idealized physical model, the ideal blackbody absorbs full incoming radiation and represents maximum radiance. The spectral radiance energy is described with Plank Formula as:

$$E_0(\lambda \cdot T) = C_1 \lambda^{-5}(e^{C_2/\lambda T} - 1)^{-1} \qquad (1)$$

Where $E_0(\lambda \cdot T)$ is spectral radiant flux density of blackbody emission with unit as $Wcm^{-2} \cdot m^{-1}$; $C_1$, the first radiation constant, is equal to $3.74 \times 10^{-12}$ $W \cdot cm^{-2}$; $C_2$, the second radiation constant, is equal to $1.44$ $cm \cdot K$; $\lambda$ is the wave length of spectrum radiation with unit as $\mu m$; T is the ideal temperature of blackbody with unit as K.

The above is the standard physical model of ideal blackbody. The existence in the nature (objects to be measured), however, has lower absorption and radiation capability than ideal blackbody (referred to as grey body). In order to correct the error between ideal blackbody and grey body, a physical model similar to practice is designed. The spectrum radiance energy of the grey body is described as:

$$E(\lambda \cdot T) = \epsilon(\lambda \cdot T) E_0(\lambda \cdot T) \qquad (2)$$

Where $\epsilon(\lambda \cdot T)$ is the radiance of the object to be measured at Temperature T with radiation wave length $\lambda$; $0 < \epsilon(\lambda \cdot T) < 1$ Formula (2) represents that radiation thermometer can be designed on the basis of thermal radiation rule of blackbody, assuming that thermal radiation received by optical system is proportional to $E_0(\lambda \cdot T)$. $\epsilon(\lambda \cdot T)$ is refined to improve precision of the measurement. However, the thermal radiation received by radiation thermometer is proportional to $E(\lambda \cdot T)$. Therefore, $\epsilon(\lambda \cdot T)$ of the object must be obtained in application, which means that radiance correction is required. However, radiance $\epsilon(\lambda \cdot T)$, which depends on material, surface state, wave length, temperature, radiation condition and environmental factors, cannot be described with explicit formula. The fact that the value of $\epsilon(\lambda \cdot T)$ cannot be precisely determined is exactly the problem of radiance correction when radiation thermometer is applied.

II. Physical Model Adopting Well-Known Microcomputer-Processed Signal in Radiation Thermometer, Consisting of Narrow Band and Broadband 1. $E_0(\lambda_0 T) = C_1 \lambda_0^{-5} e^{-C_2/\lambda_0 T}$ (3)

$E(\lambda_0 \cdot T') = \epsilon(\lambda_0 \cdot T') E_0(\lambda_0 \cdot T)$ (4)

for radiation thermometer with narrow working band.

in Formula (3), $E_0(\lambda_0 \cdot T)$ is spectral radiant flux density of ideal blackbody emission with unit as $Wcm^{-2} \cdot m^{-1}$; $C_1$, the first radiation constant, is equal to $3.74 \times 10^{-12}$ $W \cdot cm^{-2}$; $C_2$, the second radiation constant, is equal to $1.44$ $cm \cdot K$; $\lambda_0$ is working wave length of infrared temperature detector with unit as $\mu m$; T is the absolute temperature of blackbody with unit as K; in Formula (4), $E(\lambda_0 \cdot T')$ is spectrum radiance flux density of the object to be measured (grey body) emission with unit as $Wcm^{-2} \cdot m^{-1}$; T' is the temperature of the object; $\epsilon(\lambda_0 \cdot T')$ is the radiance of the object at temperature T' with radiation wave length $\lambda_0$ ($0 < \epsilon(\lambda_0 \cdot T') < 1$). The value of $\epsilon(\lambda_0 \cdot T')$ is difficult to be determined and shall be set up by the user through $\epsilon$ button on instruments.

2. $E_0(\lambda \cdot T) = \sigma T^4$ (5)

$E(\lambda_0 \cdot T') = \epsilon(\lambda_0 \cdot T') E_0(\lambda \cdot T)$ (6)

for radiation thermometer with broad working band, in Formula (5) and (6), $E_0(\lambda \cdot T)$ is unit radiant exitance of ideal blackbody, including the overall power of various wave length, with unit as $W/cm^2$; $\sigma$, the Stefan Constant, is equal to $5.67 \times 10^{-12}$ $W/cm^2 \cdot K^4$; T is the temperature of ideal blackbody; $E(\lambda_0 \cdot T')$ is unit radiant exitance of the object (grey body), including the overall power of various wave length, with unit as $W/cm^2$; T' is the temperature of the object; $\epsilon(\lambda_0 \cdot T')$ is the radiance of the object at temperature T' with radiation wave length $\lambda_0$, where $0 < \epsilon(\lambda_0 \cdot T') < 1$; $\lambda_0$ is the central wavelength of the working band of the instrument. The value of $\epsilon(\lambda_0 \cdot T')$ is difficult to be determined and shall be set up by the user through $\epsilon$ button on the instrument. In the prior arts, radiation thermometers are calibrated by standard blackbody, the temperature of which is controlled by thermocouple thermometer. Therefore, the temperature of blackbody measured by radiation thermometer shall be consistent with the known controlled temperature. The radiation thermometer calibrated as per the above requirement is only applicable to measure the brightness temperature of the object (When the radiation power of the object is equal to that of blackbody with temperature T, T is defined as brightness temperature of the object.) The real temperature of the object is only available when the value of radiance $\epsilon$ is set by the user.

In general, the temperature measured by the method applied to radiation thermometers in prior arts deviates significantly from the real temperature of the object to be measured. The brightness temperature of the object is measured, while the real temperature is difficult to be determined.

SUMMARY OF THE INVENTION

In order to improve the accuracy of temperature measurement and expand the application, the present invention provides a quantum theory correction method and radiation thermometer system for improving the accuracy of radiation thermometer. The said method comprises the following procedures:

(1) Measure the standard temperature Ti of the object by using standard temperature measurement instrumentation. Measure the thermal radiation signal voltage Ui(Ti) of the object, where i=1, 2, 3, 4 ... N and N is a positive integer, by using radiation thermometer system at the status of calibration. Input the said standard temperature Ti and the said thermal radiation signal voltage Ui(Ti) into a PC or MCU with physical model outside or inside the radiation thermometer system for data processing to acquire parameters reflecting energy level structure. The said physical model includes:

$U(T)=A(e^{B/T}-1)^{-1}$ is used in the case of radiation thermometer system with narrow working band. After working band is selected suitably, the model is simplified as $U(T)=A(e^{B/T})$ if the working band is short wave; and $U(T)=AT+B$ if the working band is long wave. The parameters A and B reflecting energy level structure are obtained by inputting data into the physical model and fitting it with least square method;

$$U(T) = \int_{\lambda_1}^{\lambda_2} A(\lambda)(e^{B(\lambda)/T} - 1)^{-1} d\lambda$$

is used in the case of radiation thermometer system with broad working band, where $A(\lambda)=C_1\lambda^{-5}$ and $B(\lambda)=-C_2/\lambda$.

After working band is selected suitably, the model is simplified as $U(T)=AT^4+BT^3+CT^2+DT$ if the working band is that of short wave; $U(T)=AT+B$ if the working band is that of long wave. Parameters of A, B, C and D, or parameters A and B reflecting energy level structure are obtained by inputting data into the physical model and fitting with least square method;

$U(T)=AT^B$ is used in the case of radiation thermometer system with infinite working band. Parameters A and B reflecting energy level structure are obtained by inputting data into the physical model and fitting it with least square method.

(2) Input the said acquired parameters reflecting energy level structure into the PC or MCU inside radiation thermometer system to calibrate the said radiation thermometer system;

(3) Activate the said radiation thermometer system into temperature measurement mode to measure the temperature of the object. Acquire the radiation energy value of the object through optical system;

(4) Acquire the temperature value of the object by calculating and processing through the PC or MCU inside the said radiation thermometer system according to the physical model;

(5) Display the said temperature value on a displayer.

The said radiation thermometer system functions to determine the value of parameters reflecting the energy level structure of the object to be measured and to determine the temperature value of the object.

Inputting the obtained said parameters reflecting energy level structure into the PC or MCU inside radiation thermometer system to calibrate the radiation thermometer in Step (2) particularly includes:

input the acquired parameters A and B reflecting energy level structure into the radiation thermometer system to calibrate the radiation thermometer system with narrow working band; input the acquired parameters A, B, C and D, or parameters A and B reflecting energy level structure into the radiation thermometer system to calibrate the radiation thermometer system with broad working band; input the acquired parameters A and B reflecting energy level structure into radiation thermometer system to calibrate the radiation thermometer system with infinite working band.

The said acquired parameters reflecting energy level structure are input into the said radiation thermometer system by keyboard input or data transmission.

The temperature value of the object to be measured is obtained by calculation of PC or MCU inside the said radiation thermometer system according to physical model in Step (4), in particular that:

The temperature value of the object to be measured is obtained by calculation of PC or MCU inside the said radiation thermometer system according to narrow-band physical model or broadband physical model or infinite-band physical model.

The said standard instrumentation for temperature measurement is standard platinum resistance thermometer, standard thermocouple thermometer or standard mercury thermometer.

A quantum-theory-corrected radiation thermometer system for improving the accuracy of radiation thermometer, the said radiation thermometer system comprises:

Measurement module, which is used for measuring the standard temperature Ti by standard instrumentation of temperature measurement; the thermal radiation signal voltage Ui(Ti) of the object to be measured, where i=1, 2, 3, 4 ... N (N is a positive integer), is measured by the radiation thermometer system under calibration state. The said standard temperature Ti and the said thermal radiation signal voltage Ui(Ti) are input into PC or MCU inside or outside the radiation thermometer system with physical model for data processing.

The said physical model includes:

$U(T)=A(e^{B/T}-1)^{-1}$ in the case of radiation thermometer system with narrow working band. After working band is selected properly, the above model is simplified as $U(T)=A(e^{B/T})$ if the working band is short wave; and as $U(T)=AT+B$ if the working band is long wave. Parameters A and B reflecting energy level structure are obtained by inputting data into the physical model and processing data with least square method.

$$U(T) = \int_{\lambda_1}^{\lambda_2} A(\lambda)(e^{B(\lambda)/T} - 1)^{-1} d\lambda$$

in the case of radiation thermometer system with broad working band, where $A(\lambda)=C_1\lambda^{-5}$ and $B(\lambda)=-C_2/\lambda$. After working band is selected properly, the model is simplified as $U(T)=AT^4+BT^3+CT^2+DT$ if the working band is short wave;

$U(T)=AT+B$ if the working band is long wave. Parameters of A, B, C and D, or parameters A and B, reflecting energy level structure are obtained by inputting data into the physical model and fitting it with least square method.

$U(T)=AT^B$ in the case of radiation thermometer system with infinite working band. Parameters A and B reflecting energy level structure are obtained by inputting data into the physical model and fitting with least square method.

Calibration module, used for calibrating the said radiation thermometer system by inputting the said parameters reflecting energy level structure into PC or MCU inside the radiation thermometer system;

PC or MCU inside radiation thermometer system, used for calibrating the said radiation thermometer as per the said parameters reflecting energy level structure; and calculating as per the physical model to obtain the temperature value of the object to be measured.

Temperature measurement module, used for setting the said radiation thermometer system under temperature measurement condition and measuring the temperature of the object;

Optical system, infrared detector and amplifier circuit, used for receiving radiation energy of the object to be measured;

PC or MCU outside or inside the radiation thermometer system, used for processing the said acquired standard temperature Ti and the said thermal radiation signal voltage Ui(Ti) and acquiring parameters reflecting energy level structure according to the physical model;

Displayer, used for displaying the said acquired temperature value.

The said radiation thermometer system is capable of determining the value of parameters reflecting energy level structure of the object and determining the temperature value of the object to be measured.

The said calibration module comprises:

Primary calibration sub module, used for inputting the acquired parameters A and B reflecting energy level structure into PC or MCU inside the said radiation thermometer system to calibrate the radiation thermometer system with narrow working band;

Secondary calibration sub module, used for inputting the acquired parameters A, B, C and D, or A and B reflecting energy level structure into PC or MCU inside the said radiation thermometer system to calibrate radiation thermometer system with broad working band;

Third calibration sub module, used for inputting the acquired parameters A and B reflecting energy level structure into PC or MCU inside the said radiation thermometer system to calibrate radiation thermometer system with infinite working band.

The said calibration module also includes:

Keyboard input or data transmission module, used for inputting the said acquired parameters reflecting energy level structure into PC or MCU inside the said radiation thermometer system.

The temperature of the object to be measured is obtained by calculation of PC or MCU inside the said radiation thermometer system according to physical model, in particular that The temperature of the object to be measured is obtained by calculation according to narrow-band physical model or broadband physical model or infinite-band physical model.

The said standard instrumentation for temperature measurement is standard platinum resistance thermometer or standard thermocouple thermometer or standard mercury thermometer.

The technical solutions provided in the present invention have benefits as follows:

The present invention provides a method that parameters reflecting energy level structure are obtained by processing data based on effective physical model with keyboard input or data transmission; the temperature value of the object to be measured is eventually obtained and displayed on the displayer. By overcoming the difficulty that radiance $\epsilon(\lambda \cdot T)$ can not be determined precisely which is encountered when "radiance correction" method is used for improving the accuracy of temperature measurement, while the accuracy of radiation thermometer is significantly improved. Theoretically, the application of the present invention can be used to design radiation thermometer according to specific conditions of measurement, where the specific conditions comprise various factors affecting the receipt of radiation energy from the object by the optical system of instrument such as radiance of the object, background radiation, medium absorption, working band of radiation thermometer, etc. The present invention can eliminate the system error due to difficulty of radiance correction and various environmental influences, so that the accuracy of radiation thermometer will be significantly improved.

The parts represented by each number in the figures are listed as follows:

1—Object to be measured;
2—Optical system;
3—Infrared detector;
4—Amplifier circuit;
5—PC or MCU;
6—Keyboard input or data transmission input;
7—Displayer;
8—Measurement module;
9—Calibration module;
10—Temperature measurement module;
11—External or internal PC or MCU;
91—Primary calibration sub module;
92—Secondary calibration sub module;
93—Third calibration sub module;
94—Keyboard input or data transmission module.

DESCRIPTION OF THE EMBODIMENTS

In order to further explain the aim, art and advantages of the present invention, the embodiments of the present invention will be described in detail with the attached figures.

Figure 1:
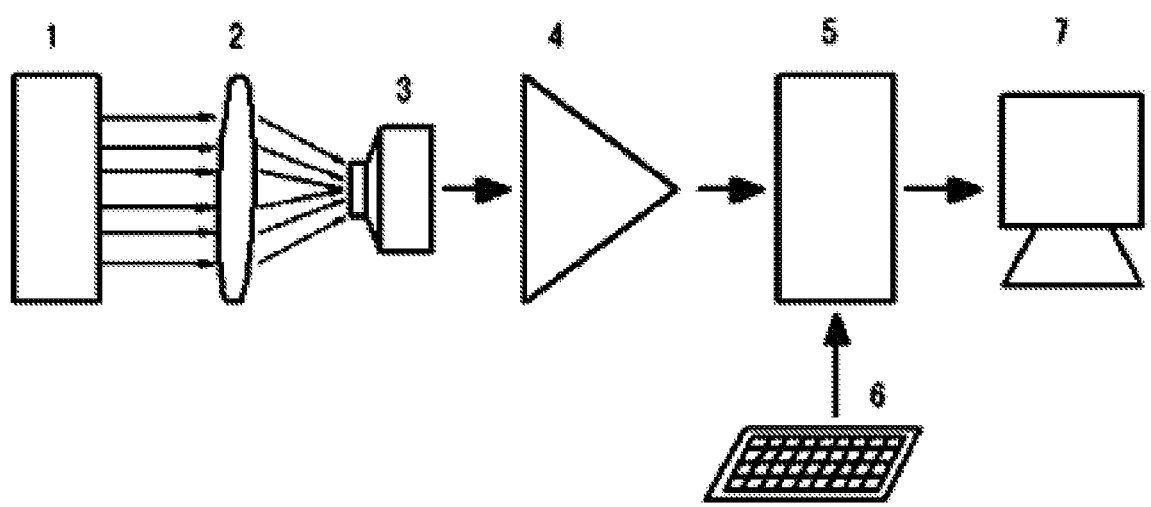
FIG. 1 shows the functional diagram of the present invention.
Figure 2:
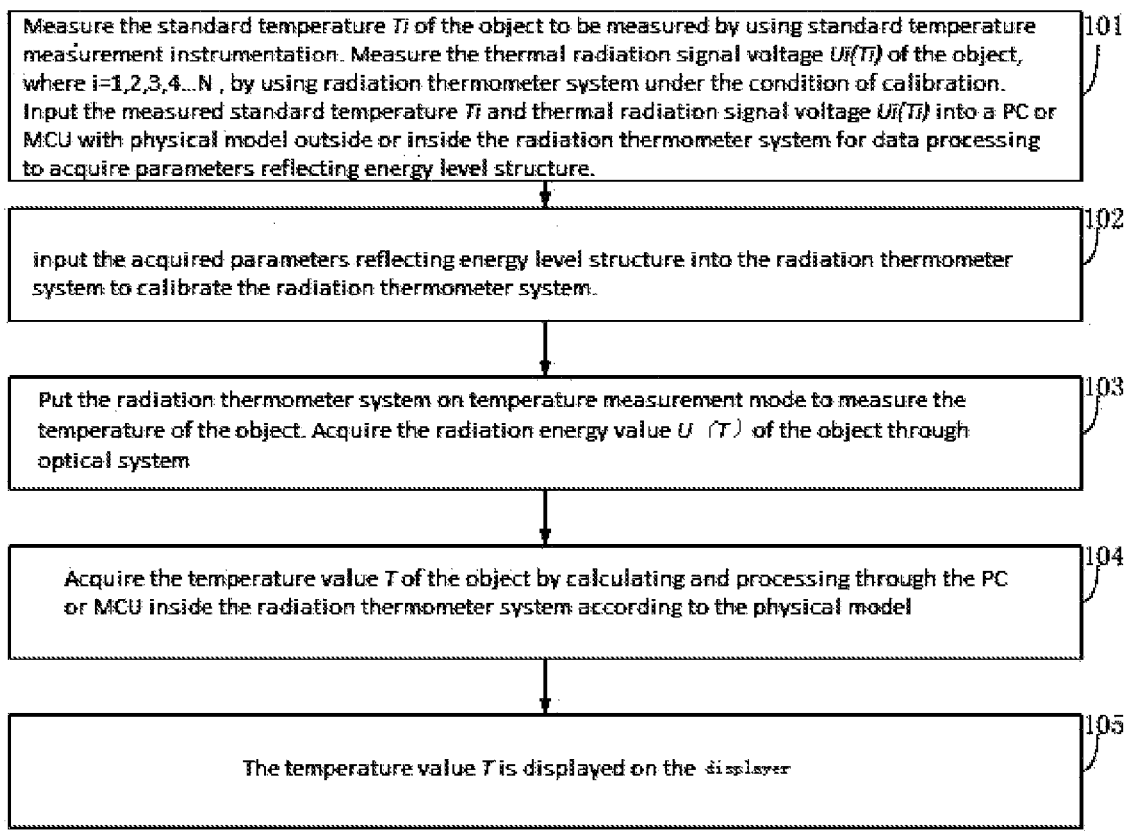
FIG. 2 shows the flow chart of the present invention.

In order to improve the accuracy of temperature measurement and expand scope of application, the present invention embodiments provide a quantum theory correction method and radiation thermometer system for improving accuracy of radiation thermometer. The embodiments, based on the modern quantum theory that the essence of radiation is quantum transition of microscopic particles, describe the Plank equation with wavelength as "parameters reflecting energy level structure", and determine the value of the "parameters reflecting energy level structure" for the object to be measured by experimental method. The present invention overcomes the difficulty in improving accuracy of radiation thermometer by applying radiance correction method in the past 100 years, and improves the accuracy of radiation thermometer significantly. Shown in FIG. 1 and FIG. 2, are described in detail as follows:

101: Measure the standard temperature Ti of the object to be measured using standard temperature measurement instrumentation. Measure the thermal radiation signal voltage Ui(Ti) of the object, where i=1, 2, 3, 4 . . . N and N is a positive integer, using radiation thermometer system under the condition of calibration. Input the measured standard temperature Ti and thermal radiation signal voltage Ui(Ti) into a PC or MCU with physical model outside or inside the radiation thermometer system for data processing to acquire parameters reflecting energy level structure; wherein N is a positive integer.

The standard instrument for temperature measurement is standard platinum resistance thermometer, standard thermocouple thermometer or standard mercury thermometer.

The radiation thermometer system has the functions of calibration and temperature measurement, wherein calibration aims to determine the value of parameters reflecting energy level structure, while temperature measurement aims to determine the temperature of the object to be measured.

Furthermore, the physical models installed to PC or MCU outside or inside radiation thermometer system include:

$U(T)=A(e^{B/T}-1)^{-1}$ (Plank formula) in the case of radiation thermometer with narrow working band; this physical model has very complicated calculations, but after suitable working band is selected, the model can be simplified into the following physical models:

[1] $U(T)=A\,(e^{B/T})$ (Wien equation) if the working band is short wave,

[2] $U(T)=AT+B$ (Rayleigh-Jeans law) if the working band is long wave.

The parameters A and B reflecting energy level structure are obtained by inputting data into the physical model and fitting it with least square method.

$$U(T) = \int_{\lambda_1}^{\lambda_2} A(\lambda)(e^{B(\lambda)/T} - 1)^{-1} d\lambda$$

(integral with respect to Plank formula in working band) in the case of radiation thermometer with broad working band; where $A(\lambda)=C_1\lambda^{-5}$ and $B(\lambda)=-C_2/\lambda$. This physical model has very complicated calculations, but after suitable working band is selected, the model can be simplified into the following physical models:

[3] $U(T)=AT^4+BT^3+CT^2+DT$ (integral with respect to Wien equation in working band) if the working band is short wave,

[4] $U(T)=AT+B$ (integral with respect to Rayleigh-Jeans law in working band) if the working band is long wave.

Parameters A, B, C and D or parameters A and B reflecting energy level structure are obtained by inputting data into the physical model and fitting it with least square method.

$U(T)=AT^B$ in the case of radiation thermometer with infinite working band. Parameters A and B reflecting energy level structure are obtained by inputting data into the physical model and fitting it with least square method.

Wherein integral with respect to Wien equation in working band is:

$$U(T) = \int_{\lambda_1}^{\lambda_2} A(\lambda)(e^{B(\lambda)/T}) d\lambda = AT^4 + BT^3 + CT^2 + DT$$

where $A(\lambda)=C_1\lambda^{-5}$ and $B(\lambda)=-C_2/\lambda$.

102: Input the said obtained parameters reflecting energy level structure into the PC or MCU inside the radiation thermometer system to calibrate the said radiation thermometer system;

This step includes:

Inputting the acquired parameters A and B reflecting energy level structure into the PC or MCU inside radiation thermometer system to calibrate the radiation thermometer system with narrow working band; inputting the acquired parameters A, B, C and D or parameters A and B reflecting energy level structure into the PC or MCU inside radiation thermometer system to calibrate the radiation thermometer system with broad working band; inputting the acquired parameters A and B reflecting energy level structure into PC or MCU inside radiation thermometer system to calibrate the radiation thermometer with infinite working band.

The acquired parameters reflecting energy level structure are input into PC or MCU inside radiation thermometer system by keyboard (numerical keyboard) input or data transmission input.

103: Activate the radiation thermometer system into temperature measurement status to measure the temperature of the object. Acquire the radiation energy value U(T) of the object through optical system;

104: Acquire the temperature value T of the object to be measured by calculating and processing through the PC or MCU inside the radiation thermometer system according to the physical model;

In this step, the temperature value T of the object to be measured is obtained by calculation of PC or MCU inside the radiation thermometer system according to narrow-band physical model or broadband physical model or infinite-band physical model.

105: The temperature value T is displayed on the displayer.

Therefore, the present invention embodiments provide a quantum theory correction method for improving the accuracy of the radiation thermometer. Parameters reflecting energy level structure are obtained by processing data based on effective physical model with keyboard input or data transmission. The temperature value of the object to be measured is finally obtained and displayed on the displayer. By overcoming the difficulty that radiance $\epsilon(\lambda \cdot T)$ cannot be determined precisely which is encountered in the case of radiance correction method, the accuracy of radiation thermometer is significantly improved. Theoretically, the application of the present invention embodiments can be used to design radiation thermometer according to specific conditions of measurement, where the specific conditions comprise various factors affecting the receipt of radiation energy from the object by the optical system of instrument such as radiance of the object, background radiation, medium absorption, working band of radiation thermometer, etc. The present invention can eliminate the system error caused by the difficulty of radiance correction and various environmental influences. The accuracy of radiation thermometer will be significantly improved.

Figure 3:
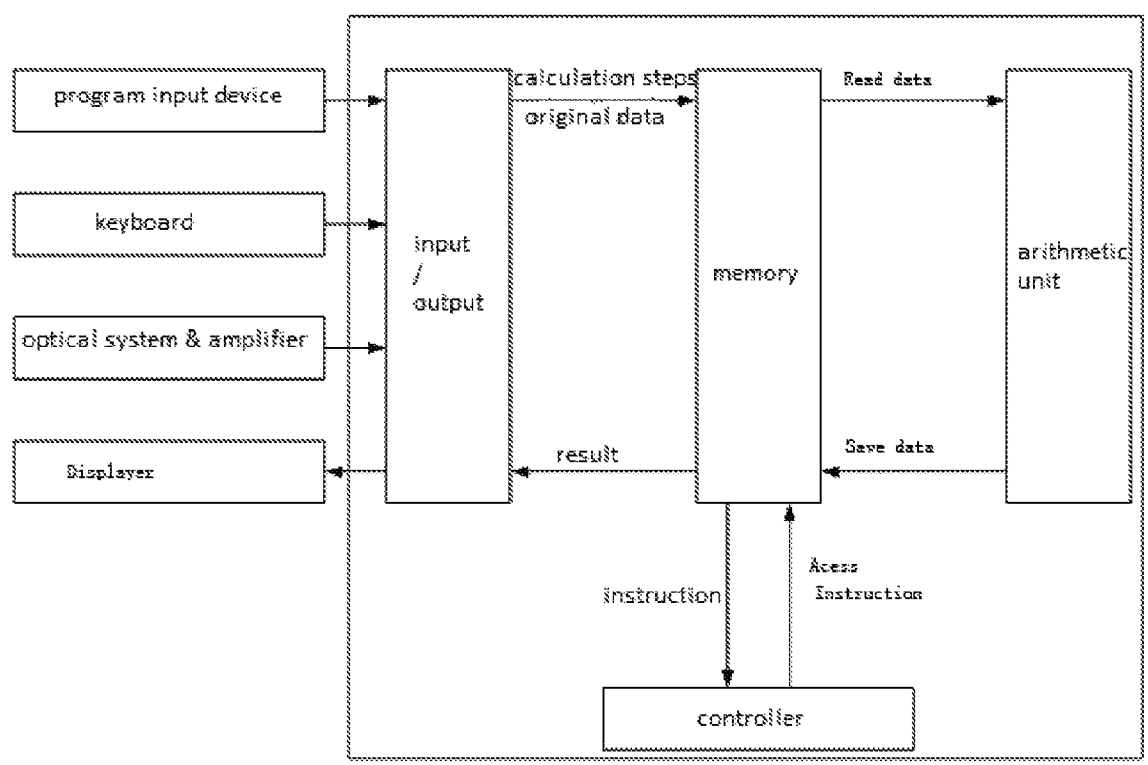
FIG. 3 shows the data processing diagram of the present invention.

The method provided in the present invention embodiment is explained in detail as follows with reference to FIG. 3 data processing diagram.

1. Input PC or MCU data processing program by program input device. Input original data and save it in read-only memory. PC or MCU is mainly used to calculate and process physical model.
2. Data that is input by keyboard or data transmission into PC or MCU is saved in random-access memory (data will be lost during shutdown) or in alterable read-only memory (data will not be lost during shutdown), mainly to provide values of parameters reflecting measurement conditions: values of A and B in corresponding physical model for radiation thermometer system with narrow working band; values of A, B, C and D or parameters A and B in corresponding physical model for radiation thermometer system with broad working band; values of A and B in corresponding physical model for radiation thermometer system with infinite working band.
3. The radiation signal of the object to be measured received by optical system of radiation thermometer is amplified by amplifier and electronic signal is obtained (shown as optical system and amplifier in the figure). The electronic signal is saved in random-access memory. U(T), i.e. Value of the radiation signal received by radiation thermometer is obtained by dividing the value of the electrical signal with the amplification factor of the amplifier.

In addition, the prior radiation thermometer system normally has only three keys: Set, Up and Down, which are used to change display status and set the value of $\epsilon$. The present invention embodiment adds ten numeric keys 0~9 so as to input the values of parameters reflecting measurement conditions. By only adding ten numeric keys 0~9 in the prior radiation thermometer system while keeping the three function keys set, $\Delta$ and $\nabla$, the present method can be applied in various kinds of radiation thermometer system. As a result, the diagram of radiation thermometer system is no longer provided here.

Preferred Embodiment

A prototype of radiation thermometer designed based on the present method has been tested with standard blackbody in Tianjin Measurement Institute under measurement conditions of: measurement distance 400 mm, room temperature 20° C., testing equipment standard blackbody furnace and blackbody cavity radiance 0.995. Comparisons between measured temperatures and temperatures of standard instrument are shown in the following test result table.

Test Result Table

| Standard temperature/° C. | 1055.0 | 1105.5 | 1154.9 | 1205.1 | 1274.5 |
|---|---|---|---|---|---|
| Measured temperature/° C. | 1057 | 1106 | 1156 | 1206 | 1275 |

The standard temperatures are measured by standard thermocouple used to measure temperature of blackbody furnace target center and the actual temperatures are measured by radiation thermometer. The test proves that the method provided in the present invention embodiment has achieved noticeable effect: resolution ratio of conventional radiation thermometer system can be approximately 0.1% of the reading while accuracy can only be approximately 1% of the reading. The test shows that the accuracy of radiation thermometer system designed based on the method provided in the present invention embodiment is at the same order of magnitude with resolution ratio, that is, accuracy can reach approximately 0.1% of the reading, which is effectively improved. The conventional method applies radiance correction to acquire the actual temperature of the object. The theoretical calculation carried by expert shows that even the radiance of blackbody furnace is 0.99, there exists a systematic error of −9.21° C. at 1200° C. However, the step length for radiance adjustment of prior radiation thermometer is 0.01 and the error is never smaller than 0.01. Therefore, the above measured results tend to be deemed as impossible by the prior theories.

The various prior radiation thermometer systems, to which the radiance correction method is applied, can be modified based on the present method. Apparently, any adoption of quantum theory correction method switching from radiance correction method shall be under the protection of the present invention.

Figure 4:
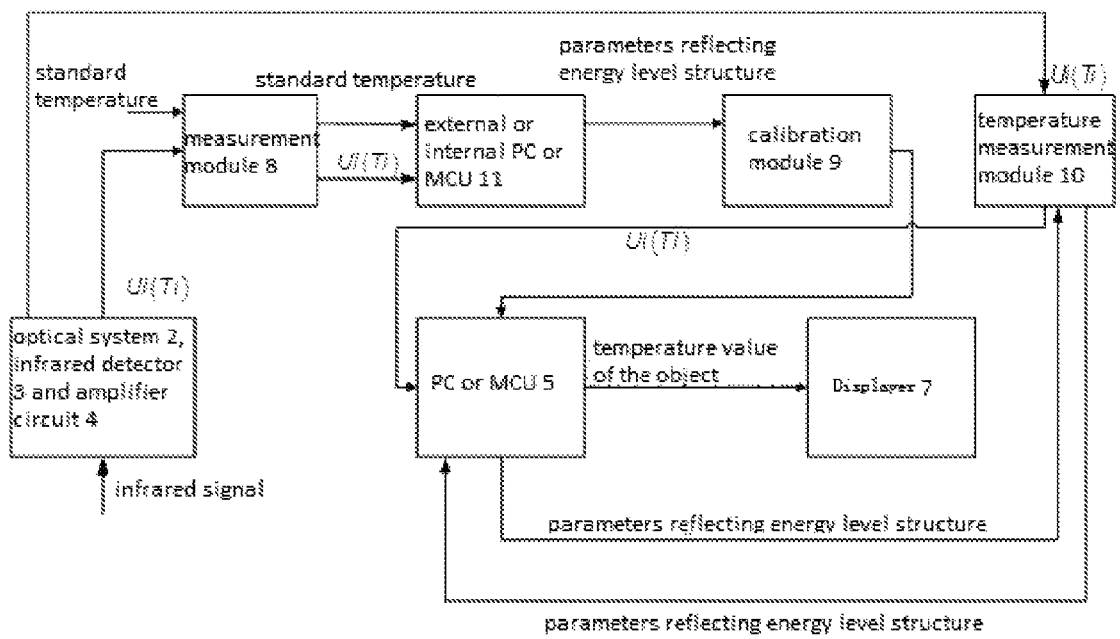
FIG. 4 shows the structure schematic diagram of the radiation thermometer system provided in the present invention.

A quantum theory correction radiation thermometer system for improving the accuracy of radiation thermometer, in reference to FIG. 4, radiation thermometer system comprises: Measurement module 8, which is used for measuring the standard temperature Ti by standard instrumentation of temperature measurement; the thermal radiation signal voltage Ui(Ti) of the object to be measured, where i=1, 2, 3, 4 . . . N (N is positive integer), is measured by the radiation thermometer system under calibration state. The measured standard temperature Ti and thermal radiation signal voltage Ui(Ti) are input into PC or MCU inside or outside the radiation thermometer system 11 with physical model for data processing;

The physical model includes:

$U(T)=A(e^{B/T}-1)^{-1}$ in the case of radiation thermometer system with narrow working band. After working band is selected properly, the above model is simplified as $U(T)=A(e^{B/T})$ if the working band is short wave; and as $U(T)=AT+B$ if the working band is long wave. Parameters A and B reflecting energy level structure are obtained by inputting data into the physical model and processing data with least square method.

$$U(T) = \int_{\lambda_1}^{\lambda_2} A(\lambda)(e^{B(\lambda)/T} - 1)^{-1} d\lambda$$

in the case of radiation thermometer system with broad working band, where $A(\lambda)=C_1\lambda^{-5}$ and $B(\lambda)=-C_2/\lambda$. After working band is selected properly, the model is simplified as $U(T)=AT^4+BT^3+CT^2+DT$ if the working band is short wave;

$U(T)=A+B$ if the working band is long wave. Parameters of A, B, C and D or parameters A and B reflecting energy level structure are obtained by inputting data into the physical model and fitting with least square method.

$U(T)=AT^B$ in the case of radiation thermometer system with infinite working band. Parameters A and B reflecting energy level structure are obtained by inputting data into the physical model and fitting with least square method.

Calibration module 9, used for calibrating the radiation thermometer system by inputting the parameters reflecting energy level structure into PC or MCU 5 inside the radiation thermometer system;

PC or MCU inside radiation thermometer system 5, used for calibrating the radiation thermometer system as per the parameters reflecting energy level structure; and calculating as per the physical model to obtain the temperature value of the object to be measured;

Temperature measurement module 10, used for setting the radiation thermometer system under temperature measurement condition and measuring the temperature of the object;

Optical system 2, infrared detector 3 and amplifier circuit 4, used for receiving radiation energy of the object to be measured;

PC or MCU 11 outside or inside the radiation thermometer system, used for processing the acquired standard temperature Ti and the thermal radiation signal voltage Ui(Ti) according to the physical model and acquiring parameters reflecting energy level structure;

Displayer 7, used for displaying the acquired temperature value.

When implemented, the radiation thermometer system is capable of determining the value of parameters reflecting energy level structure of the object and determining the temperature value of the object to be measured.

Figure 5:
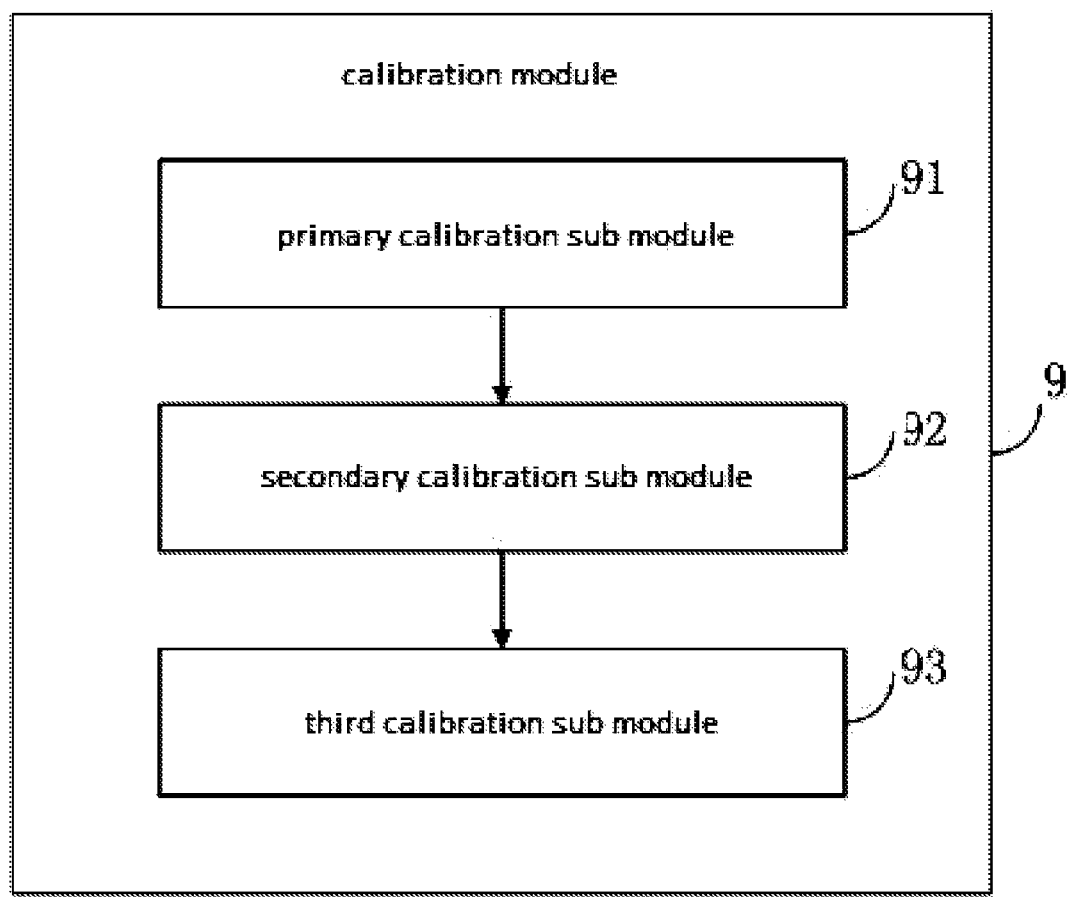
FIG. 5 shows the structure schematic diagram of the calibration module provided in the present invention.

Refer to FIG. 5, calibration module 9 comprises:

primary calibration sub module 91, used for inputting the acquired parameters A and B reflecting energy level structure into PC or MCU 5 inside the radiation thermometer system to calibrate the radiation thermometer system with narrow working band;

secondary calibration sub module 92, used for inputting the acquired parameters A, B, C and D or A and B reflecting energy level structure into PC or MCU 5 inside the radiation thermometer system to calibrate radiation thermometer system with broad working band;

third calibration sub module 93, used for inputting the acquired parameters A and B reflecting energy level structure into PC or MCU 5 inside the radiation thermometer system to calibrate radiation thermometer system with infinite working band.

Figure 6:
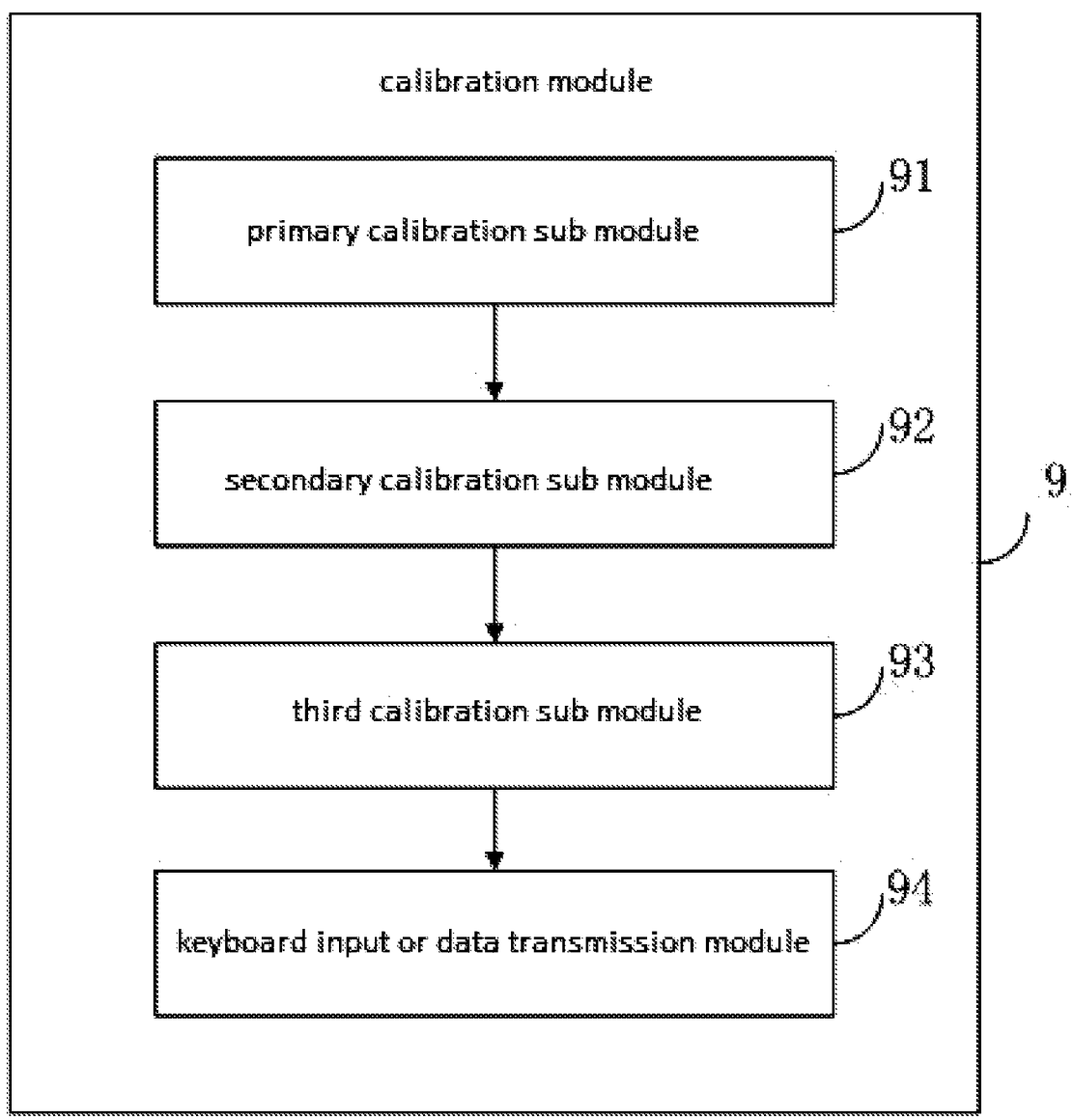
FIG. 6 shows another structure schematic diagram of the calibration module provided in the present invention.

Refer to FIG. 6, the calibration module 9 also includes:

Keyboard input or data transmission module 94, used for inputting the acquired parameters reflecting energy level structure into PC or MCU 5 inside the radiation thermometer system.

The temperature of the object to be measured is obtained by calculation of PC or MCU 5 inside the radiation thermometer system according to physical model, in particular that:

The temperature value of the object to be measured is obtained by calculation according to narrow-band physical model or broadband physical model or infinite-band physical model.

During implementation, the standard instrumentation for temperature measurement is standard platinum resistance thermometer, standard thermocouple thermometer or standard mercury thermometer.

To sum up, the present invention embodiments provide a quantum theory correction radiation thermometer system for improving the accuracy of the radiation thermometer. Parameters reflecting energy level structure are obtained by processing data based on effective physical model with keyboard input or data transmission. The temperature value of the object to be measured is finally obtained and displayed on the displayer. By overcoming the difficulty that radiance $\epsilon(\lambda \cdot T)$ cannot be determined precisely which is encountered when "radiance correction" method is used for improving the accuracy of temperature measurement, the accuracy of radiation thermometer is significantly improved. Theoretically, the application of the present invention can be used to design radiation thermometer according to specific conditions of measurement, where the specific conditions comprise various factors affecting the receipt of radiation energy from the object by the optical system of instrument such as radiance of the object, background radiation, medium absorption, working band of radiation thermometer, etc. The present invention is able to eliminate system error caused by difficulty of radiance correction and various environmental influences, so that, the accuracy of radiation thermometer is significantly improved.

People skilled in the art understand that the attached figures are only diagrams of preferred embodiments of the present invention; the sequential number of the above mentioned embodiments of the present invention is only for description and not the order of superiority.

The above are only preferred embodiments of the present invention, described by way of illustration and not limitation. Various modifications, substitutions and improvements made without departing from the spirit and claims of the invention shall fall within the scope of protection of the present invention.

The invention claimed is:

1. A quantum theory correction method for improving accuracy of a radiation thermometer system, the said method comprising following procedures:

(1) Measure a standard temperature Ti of a object by using standard temperature measurement instrumentation; measure the thermal radiation signal voltage Ui(Ti) of the object, where i=1, 2, 3, 4 . . . N and N is a positive integer, by using the radiation thermometer system at a calibration state; input the said standard temperature Ti and the said thermal radiation signal voltage Ui(Ti) into a PC or MCU radiation for data processing to acquire parameters reflecting energy level structure; using a said physical model includes:

$U(T)=A(e^{B/T}-1)^{-1}$ is used in the case of the radiation thermometer system with narrow working band; after working band is selected suitably, the model is simplified as $U(T)=A(e^{B/T})$ if the working band is short wave; and $U(T)=AT+B$ if the working band is long wave; the parameters A and B reflecting energy level structure are obtained by inputting data into the physical model and fitting it with least square method;

$$U(T) = \int_{\lambda_1}^{\lambda_2} A(\lambda)\left(e^{\frac{B(\lambda)}{T}} - 1\right)^{-1} d\lambda$$

is used in the case of radiation thermometer system with broad working band, where $A(\lambda)=C_1\lambda^5$ and $B(\lambda)=-C_2/\lambda^5$; after working band is selected suitably, the model is simplified as $U(T)=A\,T^4+BT^3+CT^2+DT$ if the working band is short wave; $U(T)=AT+B$ if the working band is long wave; parameters of A, B, C and D, or parameters A and B, reflecting energy level structure are obtained by inputting data into the physical model and fitting it with least square method;

and $U(T)=A\,T^B$ is used in the case of radiation thermometer system with infinite working band; Parameters A and B reflecting energy level structure are obtained by inputting data into the physical model and fitting it with least square method;

(2) input the said obtained parameters reflecting energy level structure into the radiation thermometer system;

(3) set the said radiation thermometer system at temperature measurement status to measure the temperature of the object. Acquire the radiation energy value of the object through optical system;

(4) acquire the temperature value of the object by calculating and processing through the PC or MCU inside the said radiation thermometer system according to the physical model;

(5) display the said temperature value on a displayer.

2. The said quantum theory correction method for improving the accuracy of radiation thermometer according to claim 1, wherein the said radiation thermometer system functions to determine the value of parameters reflecting the energy level structure of the object to be measured and to determine the temperature value of the object.

3. The said quantum theory correction method for improving the accuracy of radiation thermometer according to claim 1, wherein the obtained said parameters reflecting energy level structure are input into the radiation thermometer system to calibrate the radiation thermometer in Step (2), including:

input the acquired parameters A and B reflecting energy level structure into the radiation thermometer system to calibrate the radiation thermometer with narrow working band; input the acquired parameters A, B, C and D or parameters A and B reflecting energy level structure into the radiation thermometer system to calibrate the radiation thermometer with broad working band; input the acquired parameters A and B reflecting energy level structure into radiation thermometer system to calibrate the radiation thermometer with infinite working band.

4. The said quantum theory correction method for improving the accuracy of radiation thermometer according to claim 3, wherein the said acquired parameters reflecting energy level structure are input into the said radiation thermometer system by keyboard input or data transmission.

5. The said quantum theory correction method for improving the accuracy of radiation thermometer according to claim 1, wherein the said acquired parameters reflecting energy level structure are input into the said radiation thermometer system by keyboard input or data transmission.

6. The said quantum theory correction method for improving the accuracy of radiation thermometer according to claim 1, wherein the temperature value of the object to be measured is obtained by calculation of PC or MCU inside the said radiation thermometer system according to physical model in Step (4), particularly that:

the temperature value of the object to be measured is obtained by calculation of PC or MCU inside the said radiation thermometer system according to narrow-band physical model, broad-band physical model or infinite-band physical model.

7. The said quantum theory correction method for improving the accuracy of radiation thermometer according to claim 1, wherein the said standard instrumentation for temperature measurement is standard platinum resistance thermometer, standard thermocouple thermometer or standard mercury thermometer.

8. A quantum theory correction system for improving accuracy of a radiation thermometer system, the said radiation thermometer system comprises:

Measurement module, which is used a standard temperature Ti of a object by using standard instrumentation for temperature measurement; the thermal radiation signal voltage Ui(Ti) of a object, where i=1, 2, 3, 4 ... N and N is a positive integer, by using the radiation thermometer system at a calibration state; the said standard temperature Ti and the said thermal radiation signal voltage Ui(Ti) into a PC or MCU for data processing to acquire parameters reflecting energy level structure; using a physical model, the said physical model includes:

$U(T)=A(e^{B/T}-1)^{-1}$ is used in the case of the radiation thermometer system with narrow working band; after working band is selected suitably, the model is simplified as $U(T)=A(e^{B/T})$ if the working band is short wave; and $U(T)=AT+B$ if the working band is long wave; the parameters A and B reflecting energy level structure are obtained by inputting data into the physical model and fitting it with least square method;

$$U(T) = \int_{\lambda_1}^{\lambda_2} A(\lambda)\left(e^{\frac{B(\lambda)}{T}} - 1\right)^{-1} d\lambda$$

is used in the case of radiation thermometer system with broad working band, where $A(\lambda)=C_1\lambda^5$ and $B(\lambda)=-C_2/\lambda^5$; after working band is selected suitably, the model is simplified as $U(T)=A T^4+BT^3+CT^2+DT$ if the working band is short wave; $U(T)=AT+B$ if the working band is long wave; parameters of A, B, C and D, or parameters A and B, reflecting energy level structure are obtained by inputting data into the physical model and fitting it with least square method;

a calibration module inside PC or MCU, used for calibrating the said radiation thermometer system by inputting the said parameters reflecting energy level structure into PC or MCU;

the said radiation thermometer system as per the said parameters and calculating as per the physical model to obtain the temperature value of the object to be measured;

a temperature measurement module, used for setting the said radiation thermometer system at temperature measurement state and measuring the temperature of the object;

an optical system, infrared detector and amplifier circuit, used for receiving radiation energy of the object to be measured;

a displayer, used for displaying the said acquired temperature value.

9. The said quantum theory correction radiation thermometer system for improving the accuracy of radiation thermometer according to claim 8, wherein the said radiation thermometer system is capable of determining the value of parameters reflecting energy level structure of the object and determining the temperature value of the object to be measured.

10. The said quantum theory correction radiation thermometer system for improving the accuracy of radiation thermometer according to claim 8, wherein the said calibration module comprises:

primary calibration sub module, used for inputting the acquired parameters A and B reflecting energy level structure into PC or MCU inside the said radiation thermometer system to calibrate the radiation thermometer system with narrow working band;

secondary calibration sub module, used for inputting the acquired parameters A, B, C and D, or parameters A and B reflecting energy level structure into PC or MCU inside the said radiation thermometer system to calibrate radiation thermometer system with broad working band;

third calibration sub module, used for inputting the acquired parameters A and B reflecting energy level structure into PC or MCU inside the said radiation thermometer system to calibrate radiation thermometer system with infinite working band.

11. The said quantum theory correction radiation thermometer system for improving the accuracy of radiation thermometer according to claim 10, wherein the said calibration module also includes:
    keyboard input or data transmission module, used for inputting the said acquired parameters reflecting energy level structure into PC or MCU inside the said radiation thermometer system.

12. The said quantum theory correction radiation thermometer system for improving the accuracy of radiation thermometer according to claim 8, wherein the said calibration module also includes:
    keyboard input or data transmission module, used for inputting the said acquired parameters reflecting energy level structure into PC or MCU inside the said radiation thermometer system.

13. The said quantum theory correction radiation thermometer system for improving the accuracy of radiation thermometer according to claim 8, wherein the temperature value of the object to be measured is obtained by calculation of PC or MCU inside the said radiation thermometer system according to physical model, in particular that:
    the temperature of the object to be measured is obtained by calculation on the basis of narrow-band physical model or broadband physical model or infinite-band physical model.

14. The said quantum theory correction radiation thermometer system for improving the accuracy of radiation thermometer according to claim 8, wherein the said standard instrumentation for temperature measurement is standard platinum resistance thermometer, standard thermocouple thermometer or standard mercury thermometer.

* * * * *